United States Patent
Spaven et al.

(10) Patent No.: US 11,431,785 B2
(45) Date of Patent: *Aug. 30, 2022

(54) DISTRIBUTED SYSTEM MANAGEMENT

(71) Applicant: BRITISH TELECOMMUNICATIONS PUBLIC LIMITED COMPANY, London (GB)

(72) Inventors: Daniel Charles Spaven, London (GB); Paul Francis McKee, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/369,319

(22) PCT Filed: Dec. 21, 2012

(86) PCT No.: PCT/GB2012/000926
§ 371 (c)(1),
(2) Date: Jun. 27, 2014

(87) PCT Pub. No.: WO2013/098542
PCT Pub. Date: Jul. 4, 2013

(65) Prior Publication Data
US 2014/0359119 A1    Dec. 4, 2014

(30) Foreign Application Priority Data

Dec. 29, 2011 (EP) .................................... 11250950
Feb. 24, 2012 (EP) .................................... 12250040
(Continued)

(51) Int. Cl.
H04L 67/10 (2022.01)
H04L 67/12 (2022.01)
(Continued)

(52) U.S. Cl.
CPC .............. *H04L 67/10* (2013.01); *G06F 9/546* (2013.01); *H04L 43/04* (2013.01); *H04L 67/12* (2013.01); *H04L 67/51* (2022.05); *H04L 67/55* (2022.05)

(58) Field of Classification Search
CPC combination set(s) only.
See application file for complete search history.

(56) References Cited

U.S. PATENT DOCUMENTS 5,793,976 A    8/1998 Chen et al.
5,822,535 A    10/1998 Takase et al.
(Continued)

FOREIGN PATENT DOCUMENTS

EP    2 405 608    1/2012
WO    WO 97/37310    10/1997
WO    2011/036663    3/2011

OTHER PUBLICATIONS

International Search Report for PCT/GB2012/000926, dated May 15, 2013.
(Continued)

*Primary Examiner* — Caroline H Jahnige
(74) *Attorney, Agent, or Firm* — Nixon & Vanderhye P.C.

(57) ABSTRACT

A system for managing compositions of software components or applications is disclosed. In particular, systems in which the software components or applications communicate with one another using message-oriented middleware are considered. The system is fed by one or more data feeds, and produces a plurality of processed feeds for respective applications. The data items in the input data feeds are processed by the software components or applications which form a data feed processing graph, with each application having a processing path (or egress-rooted tree) which results in the processed feed for that application. Managing such systems is complex. This complexity is tackled by
(Continued)

having each component processing a data feed item add an annotation to the data feed item, so that the cumulative annotation which is seen in the processed feed for an application provides a history of the processing carried out on the input data feed(s). At an egress of the processing system, this history can be compared (186) with an application-specific specification. Arranging the management of a data feed processing system in this way simplifies the management of such systems, and hence improves the efficiency of resource utilisation of such systems.

30 Claims, 8 Drawing Sheets

(30) Foreign Application Priority Data

| Feb. 24, 2012 | (EP) | 12250041 |
|---|---|---|
| Feb. 24, 2012 | (EP) | 12250042 |

(51) Int. Cl.

| G06F 9/54 | (2006.01) |
|---|---|
| H04L 67/51 | (2022.01) |
| H04L 67/55 | (2022.01) |
| H04L 43/04 | (2022.01) |

(56) References Cited

U.S. PATENT DOCUMENTS

| 7,680,939 | B2 | 3/2010 | Trevor et al. | |
|---|---|---|---|---|
| 2002/0143933 | A1 | 10/2002 | Hind et al. | |
| 2003/0072263 | A1* | 4/2003 | Peterson | H04L 29/06 370/235 |
| 2003/0236877 | A1 | 12/2003 | Allan | |
| 2005/0160431 | A1* | 7/2005 | Srivastava | G06F 11/3636 719/313 |
| 2006/0031432 | A1 | 2/2006 | Patrick | |
| 2006/0069702 | A1 | 3/2006 | Moeller et al. | |
| 2006/0085796 | A1* | 4/2006 | Hoerle | G06F 9/541 719/313 |
| 2007/0121631 | A1* | 5/2007 | Krikorian | G06F 9/546 370/392 |
| 2007/0124437 | A1 | 5/2007 | Chervets | |
| 2007/0165625 | A1* | 7/2007 | Eisner | G06F 9/546 370/389 |
| 2008/0133891 | A1 | 6/2008 | Salz et al. | |
| 2009/0019056 | A1 | 1/2009 | Othman | |
| 2009/0038001 | A1 | 2/2009 | Bozak et al. | |
| 2009/0049379 | A1 | 2/2009 | Trevor et al. | |
| 2010/0286899 | A1 | 11/2010 | Jain et al. | |
| 2010/0287541 | A1* | 11/2010 | Saunders | G06Q 30/06 717/139 |
| 2011/0082803 | A1 | 4/2011 | Kowa et al. | |
| 2011/0119680 | A1 | 5/2011 | Li et al. | |
| 2012/0008498 | A1 | 1/2012 | Clemm et al. | |
| 2012/0314608 | A1* | 12/2012 | Okuno | H04L 67/2828 370/252 |
| 2013/0086595 | A1* | 4/2013 | Findeisen | G06F 9/54 719/313 |
| 2014/0365575 | A1 | 12/2014 | Spaven | |
| 2014/0379807 | A1 | 12/2014 | Spaven | |

OTHER PUBLICATIONS

International Search Report dated May 16, 2013 for PCT/GB2012/000927 (3 pgs.).
Non-Final Rejection dated Jun. 16, 2016 issued in co-pending U.S. Appl. No. 14/369,307 (21 pgs.).
Amendment filed in Response to the Jun. 16, 2016 Office Action issued in co-pending U.S. Appl. No. 14/369,307 (11 pgs.).
International Search Report dated May 15, 2013 for PCT/GB2012/000925 (2 pgs.).
Non-Final Rejection dated Jul. 12, 2016 issued in co-pending U.S. Appl. No. 14/369,459 (17 pgs.).
Amendment filed in Response to the Jul. 12, 2016 Office Action issued in co-pending U.S. Appl. No. 14/369,459 (11 pgs.).
Erietta Liarou, Romulo Goncalves, and Stratos Idreos. 2009. Exploiting the power of relational databases for efficient stream processing. In *Proceedings of the 12th International Conference on Extending Database Technology: Advances in Database Technology* (EDBT '09), Martin Kersten, Boris Novikov, Jens Teubner, Vladimir Polutin, and Stefan Manegold (Eds.). ACM, New York, NY, USA, 323-334. DOI=http://dx.doi.org/10.1145/1516360.1516398, 2009 (12 pgs.).
Kuntschke, R., Stegmaier, B., Kemper, A.: Data Stream Sharing. Technical Report, TUM-I0504, Technische Universität München (2005) (51 pgs.).
Liarou, Erietta and Martin L. Kersten. "DataCell: Exploiting the Power of Relational Databases for Efficient Stream Processing." ERCIM News 2009 (2009) (72 pgs.).
http://www.openehealth.org/display/ipf/Flow+management—webpage downloaded on Sep. 26, 2011 (72 pgs.).
JBOSS ESB Programmers Guide—http://docs.jboss.org/jbossesb/docs/4.9/manuals/html/Programmers_Guide/#appe-Publican-Revision_History—web-page downloaded on Sep. 26, 2011 (137 pgs.).
Liarou, Erietta, and Martin L. Kersten. "DataCell: Building a Data Stream Engine on top of a Relational Database Kernel." *VLDB PhD Workshop*. 2009 (6 pgs.).
Chapter 11 of Gregor Hohpe and Bobby Woolf. 2003. *Enterprise Integration Patterns: Designing, Building, and Deploying Messaging Solutions*. Addison-Wesley Longman Publishing Co., Inc., Boston, MA, USA. 2003 (25 pgs.).
Groth P., Luck M., Moreau L. (2005) A Protocol for Recording Provenance in Service-Oriented Grids. In: Higashino T. (eds) Principles of Distributed Systems. OPODIS 2004. Lecture Notes in Computer Science, vol. 3544. Springer, Berlin, Heidelberg, 2005 (16 pgs.).
Moreau, Luc, et al. "The First Provenance Challenge." *Concurrency Computat.: Pract. Exper*. 2000 (10 pgs.).
Bowers, S., McPhillips, T. M. and Ludäscher, B. (2008), Provenance in collection-oriented scientific workflows. Concurrency Computat: Pract. Exper., 20: 519-529, 2008 (11 pgs.).
Liarou, E et al. "A Column-oriented Data Stream Engine.", 2007 (9 pgs.).
Serge Abiteboul, Bogdan Marinoiu. *Distributed Monitoring of Peer to Peer Systems. ACM WLDM 2007*, Nov. 2007, Lisbon, Portugal. 2007 (9 pgs.).
C. Cappiello, F. Daniel, M. Matera and C. Pautasso, "Information Quality in Mashups," in *IEEE Internet Computing*, vol. 14, No. 4, pp. 14-22, Jul.-Aug. 2010, doi: 10.1109/MIC.2010.60, 2010 (9 pgs.).
Paul Groth, Ewa Deelman, Gideon Juve, Gaurang Mehta, and Bruce Berriman. 2009. Pipeline-centric provenance model. In *Proceedings of the 4th Workshop on Workflows in Support of Large-Scale Science* (WORKS '09). ACM, New York, NY, USA,, Article 4, 8 pages. DOI=http://dx.doi.org/10.1145/1645164.1645168, 2009 (8 pgs.).
Waldemar Hummer, Philipp Leitner, and Schahram Dustdar. 2010. A step-by-step debugging technique to facilitate mashup development and maintenance. In *Proceedings of the 3rd and 4th International Workshop on Web APIs and Services Mashups* (Mashups '09/'10). ACM, New York, NY, USA, , Article 7, 8 pages. DOI= http://dx.doi.org/10.1145/1944999.1945006, 2010 (8 pgs.).
Pautasso, Cesare, Thomas Heinis, and Gustavo Alonso. "JOpera: Autonomic Service Orchestration." *IEEE Data Eng. Bull*. 29.3, 32-39, 2006 (66 pgs.).
M. Marazakis, D. Papadakis and C. Nikolaou, "Management of work sessions in dynamic open environments," *Proceedings Ninth International Workshop on Database and Expert Systems Applications (Cat. No. 98EX130)*, Vienna, 1998, pp. 725-730, 1998 (6 pgs.).
Koop, David, et al. "Viscomplete: Automating suggestions for visualization pipelines." *IEEE Transactions on Visualization and Computer Graphics* 14.6, 691-1698, 2008 (8 pgs.).

(56) References Cited

OTHER PUBLICATIONS

Web-page entitled "*Adding annotations to a message flow or node*", downloaded from http:/publib.boulder.ibm.com/infocenter/wmbhelp/v7r0m0/topic/com.ibm.etools.mft.doc/bc22090_.htm on Sep. 26, 2011 (3 pgs.).

Web-page headlined "Mulesoft Announces Availability of Enterprise-Class ESB Management Console" downloaded from it.tmcnet.com on Sep. 26, 2011 (2 pgs.).

Spaven, Final Rejection dated Apr. 6, 2017, issued in copending U.S. Appl. No. 14/369,307, filed Jun. 27, 2014 (25 pages).

Office Action dated Dec. 26, 2017 issued in co-pending U.S. Appl. No. 14/369,307 (24 pgs.).

Office Action dated Feb. 1, 2018 in U.S. Appl. No. 14/369,459 (19 pgs.).

Office Action dated Sep. 17, 2018 issued in co-pending U.S. Appl. No. 14/369,307 to Spaven, filed Jun. 27, 2014 (25 pages).

R. Güth and Th. Lalive d'Epinay, "The Distributed Data Flow Aspect of Industrial Computer Systems", Brown Boveri Research Center, CH-5405 Baden, Switzerland, IFAC Distributed Computer Control Systems 1983, Sabi-Sabi, South Africa, 1983, Session 1—Foundation for DCCS (8 pgs.).

Office Action dated Jun. 13, 2019 issued in Spaven et al., U.S. Appl. No. 14/369,459, filed Jun. 27, 2014 (20 pages).

Office Action dated Mar. 17, 2020 issued in Spaven et al., U.S. Appl. No. 14/369,459, filed Jun. 27, 2014 (21 pages).

U.S. Appl. No. 14/369,459, filed Jun. 27, 2014, Distributed System Management.

U.S. Appl. No. 14/369,307, filed Jun. 27, 2014, Distributed System Management.

U.S. Appl. No. 14/369,319, filed Jun. 27, 2014, Distributed System Management.

Office Action dated Dec. 8, 2020 issued in Spaven et al., U.S. Appl. No. 14/369,459, filed Jun. 27, 2014 (25 pages).

Office Action dated Jul. 21, 2021 issued in Spaven et al., U.S. Appl. No. 14/369,459, filed Jun. 27, 2014 (27 pages).

Decision to refuse a European Patent application dated Jun. 8, 2021 issued in European Patent Application 12 812 676.0 (11 pages).

Summons to attend oral proceedings pursuant to Rule 115(1) EPC dated Feb. 24, 2020 issued in European Patent Application No. 12 813 414.5 (9 pages).

\* cited by examiner

| Process Log | |
|---|---|
| Message Instance ID | 120 |
| Message Annotation | 122 |
| URL for Process Configuration | 124 |
| URL for Message Payload | 126 |
| Time Input Message Received | 128 |
| Time Output Message Sent | 130 |
| Transport Type | 132 |
| Transport-Endpoint | 134 |
| TTL | 136 |
| Message Instance ID | |
| ............ | |

Figure 5

DISTRIBUTED SYSTEM MANAGEMENT

This application is the U.S. national phase of International Application No. PCT/GB2012/000926 filed 21 Dec. 2012 which designated the U.S. and claims priority to EP Patent Application No. 11250950.0 filed 29 Dec. 2011, EP Application No. 12250040.8 filed 24 Feb. 2012, EP Patent Application No. 12250041.6 filed 24 Feb. 2012 and EP Patent Application No. 12250042.4 filed 24 Feb. 2012, the entire contents of each of which are hereby incorporated by reference.

BACKGROUND AND SUMMARY

The present invention relates to the management of distributed software applications. It has particular utility in the management of data feed processing systems.

The increasing volume and improving currency of data available to today's business executives, civil servants, and members of the public is driving the development of data processing to provide end users with derived information which is appropriately timely, concise and comprehensible.

The providers and managers of such data processing systems will need to provide end users with assurances relating to, inter alia, the availability, completeness, timeliness, volume, location and accuracy of the derived information. To do this requires the ongoing collection of information about the operation of the data processing system. Owing to the enormous volume of data passing through such data processing systems, there is an engineering need to acquire, store and query such operational information as efficiently as possible.

The present inventors anticipate that there will be an increasing trend towards data processing systems which make data feeds and data feed processing components available for use by application developers. This is particularly likely to be the case in relation to data processing networks for supporting future 'Smart Cities' which will be fed by sensors reporting information relevant to the functioning of the city and which will output processed feeds to application developers.

It is known to manage the operation of communication networks. International patent application WO 97/37310 relates to the monitoring of the performance of switches along a predetermined path for carrying cells through the network (in other words, along a connection in a connection-oriented network). In contrast to the message-oriented distributed systems discussed here, the primary purpose of such digital communication networks is the exact reproduction of a message provided to the network at one location, at a geographically distant location. This is markedly-different from message-oriented distributed systems whose purpose is to process input application data items provided to the system to provide derived application data. To put it another way, a digital communication network takes input application data, appends address and other information, and then uses the address and other information to reproduce the application data exactly at the distant location specified by the address. A message-oriented distributed system takes input application data, and then transforms or alters the input application data to provide derived application data.

European Patent Application EP 2 405 608 A1 discloses a method of performing path-orientated systems management. Once again, in contrast to the present disclosure, there is no suggestion that application data from a source external to the network is transformed or altered by the network.

There is an engineering need to provide a management system for message-oriented distributed systems which is scalable and makes efficient use of the resources of distributed system. It is to be noted that the management referred to here comprises the management of the transformation or alteration of the input application data.

According to a first aspect of the present invention there is provided a method of managing a message-oriented distributed system, said method comprising operating each of one or more management nodes of said message-oriented distributed system to:

a) receive a message comprising: i) a derived application data portion derived by one or more processing nodes in said message-oriented distributed system from one or more items of application data input into said message-oriented distributed system; and ii) application data processing history information relating to the cumulative processing carried out by said one or more processing nodes in deriving said derived application data portion; and b) compare said application data processing history information with an application data processing specification.

By operating a management node to receive a message comprising a derived application data portion and application data processing history information offering a description of the cumulative processing carried out by said one or more other processing nodes in deriving said derived application data portion, and to compare the described cumulative processing with an application data processing specification, said management node is able to manage the operation of each of said one or more processing nodes which have contributed to the derivation of said derived application data.

It is to be understood that a management node might also be a processing node. Indeed, a peer-to-peer arrangement is possible in which all processing nodes are capable of also performing the role of a management node.

It is also to be understood that the application data processing history information might include a description of the cumulative processing, or it might enable the gathering of a description of the cumulative processing from said one or more other nodes. The latter is preferred since it makes more efficient use of available network bandwidth.

In some embodiments, said message is received from a message source which provides messages for at least one other node in said message-oriented system.

In this way the comparison can be with an application data processing specification which applies to the management node, but not to the at least one other node. This provides a straightforward way of storing and applying an application data processing specification only where it is required.

To put this another way, in some message-oriented distributed systems, message processing paths can branch one or more times into a plurality of branches. By keeping application data processing history with the derived application data being processed as it moves downstream along such a processing path, and comparing said application data processing history with an application data processing specification at a point after a branching in processing paths, the activities of the management node are inherently focussed on only those paths which share the same branch as the management node.

In preferred embodiments, said management node comprises an egress node in said message-oriented distributed system, which egress node is dedicated to a particular application, said comparison being with application-specific specification.

It is anticipated that a message-oriented distributed system will be shared by a plurality of applications. In such a case, on building a new application on top of the platform provided by the message-oriented distributed system, the above feature provides a straightforward way of introducing a processing node which manages the operation of the message-oriented distributed system as far as that application is concerned. In this way, the management system scales inherently with the number of applications the message-oriented distributed system supports. Since the application will often be offered by an application provider who will have a service level agreement with the message-oriented distributed system provider, the application-specific specification might be a customer-specific specification, in particular, a service-level agreement or a condition therein.

According to a second aspect of the present invention, there is provided a management node for managing a message-oriented distributed system, said management node comprising:

a receiver arranged in operation to receive a message comprising: i) a derived application data portion derived by one or more processing nodes in said message-oriented distributed system from one or more items of application data input into said message-oriented distributed system; and ii) application data processing history information relating to the cumulative processing carried out by said one or more processing nodes in deriving said derived application data portion; and an application data processing assessor arranged in operation to compare said application data processing history with an application data processing specification.

A management node which compares an application data processing specification with a description of the processing performed by each of one or more processing nodes in deriving said application data, is able to manage the application data processing performed by those one or more processing nodes irrespective of the number of said one or more processing nodes. This provides more scalable management of a message-oriented distributed system.

In some embodiments, said receiver receives said message from a message stream which provides messages for at least one other node in said message-oriented system. In this way, the comparison with the application data processing specification can be specific to processing paths which terminate at or involve the management node. Like the division of application data processing in the message-oriented system, the division of management in the message-oriented system accords with the distribution tree which distributes a message from a shared source to plural different applications.

In some embodiments, said processing node comprises an egress node in said message-oriented distributed system, said egress node being dedicated to a particular application, said processing specification comprising an application-specific processing specification.

Each application newly supported by the message-oriented distributed system can be provided with a dedicated egress node having access to an application-specific processing specification. By making each dedicated egress node a processing node as set out above, a straightforward way of introducing management of a newly supported application is provided.

According to a third aspect of the present invention there is provided a method of managing a message-oriented distributed system, said method comprising operating each of one or more management nodes of said message-oriented distributed system to:

a) receive a message comprising: i) an output message payload generated by one or more processing nodes in said message-oriented distributed system; and ii) payload processing history information relating to the cumulative processing carried out by said one or more processing nodes in generating said output message payload; and b) compare said payload processing history information with a payload processing specification.

According to a fourth aspect of the present invention, there is provided method of managing the operation of one or more distributed software applications involving the sequential execution of a plurality of software components, said method comprising:

arranging one or more of said software components to add information concerning the software component together with data transformed by said component to a subsequent software component in said sequential execution; and at said subsequent software component, checking the annotation of said data for compliance with stored expectations.

BRIEF DESCRIPTION OF THE DRAWINGS

There now follows, by way of example only, a description of embodiments of the present invention. This description refers to the accompanying drawings in which:

FIG. 5 illustrates an entry in a log file maintained by each data processing component in the pipeline processing system;

DETAILED DESCRIPTION OF PRESENT EXAMPLE EMBODIMENTS

Figure 1:
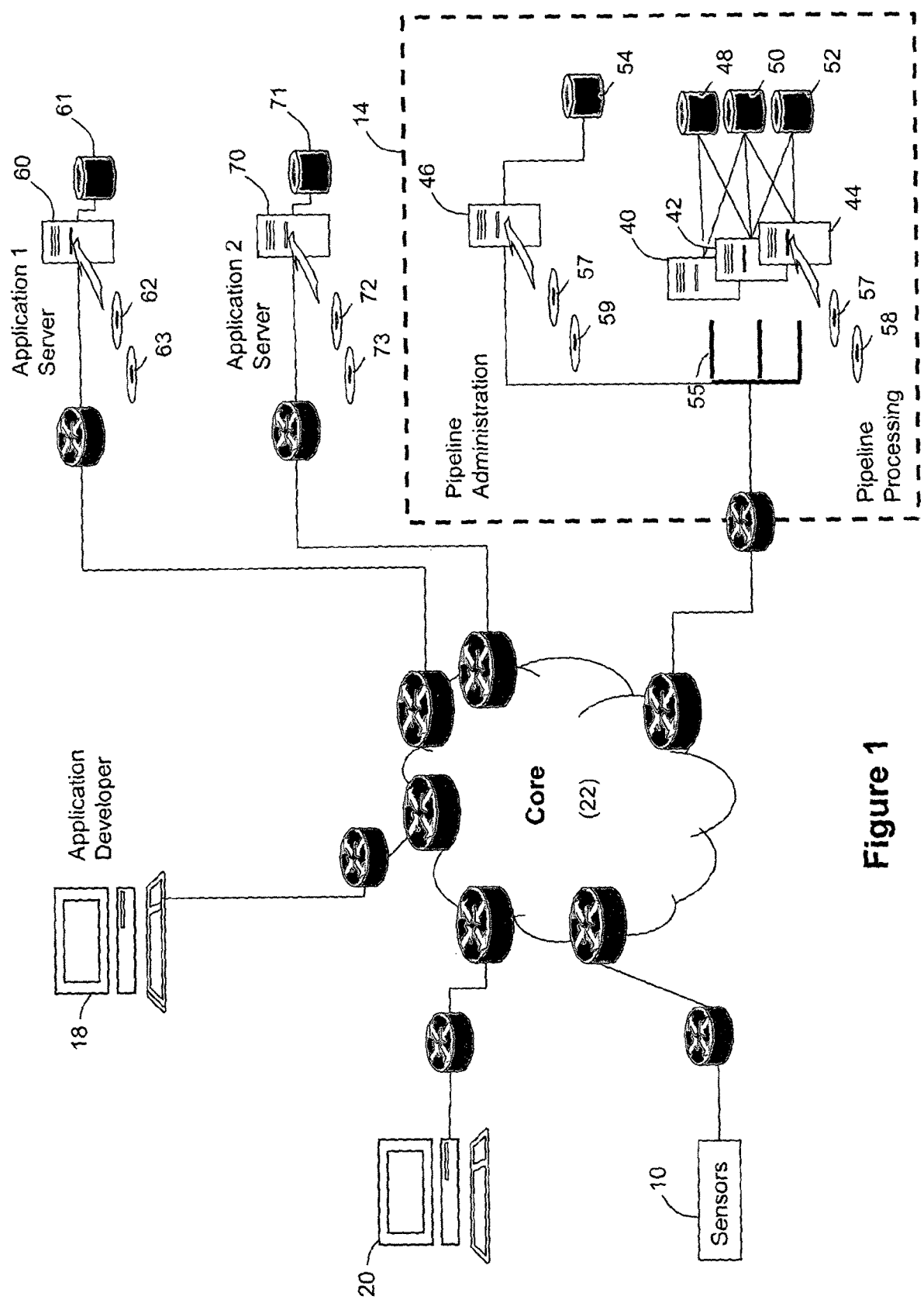
FIG. 1 illustrates a computer network for supporting sensor-based applications.

A wide-area computer network (FIG. 1) has a network which gathers information from sensors or monitors 10, a mashup-hosting data centre 14, a first server computer 60 offering a first application which is based on information derived from information provided by the sensors or monitors 10, a second server computer 70 offering a second application which is based on information derived from information provided by the sensors or monitors 10, an application developer's personal computer 18, and an application user's personal computer 20. The instrumentation network 10, mashup-hosting data centre 14, server computers 60, 70, application developer's personal computer 18, and end user's personal computer 20, are in digital communication with one another by virtue of a wide-area network 22. In this embodiment, the wide-area network is an internetwork, in particular the Internet.

The mashup-hosting data centre 14 is used by an Information and Communication Technologies (ICT) services provider to provide a mashup development and hosting platform to mashup developers. Mashup here is used to refer to a composition of co-operating software components and/or applications.

The mashup-hosting data centre 14 comprises a plurality of pipeline component hosting computers 40, 42, 44 and a pipeline management computer 46. The pipeline component hosting computers 40-44 share network storage devices 48, 50, 52. The pipeline management computer 46 has persistent storage 54. The pipeline component hosting computers 40, 42, 44, pipeline management computer 46, and network storage devices 48, 50, 52 are in digital communication with one another by virtue of a local area network 55 within the data centre.

It will be appreciated by those skilled in the art that, whilst the data centre computers are illustrated as separately-housed computers, they will in practice be server blades or such like installed in racks.

The pipeline hosting component computers 40,42,44 and pipeline administration computer 46 have middleware installed upon them from CD-ROM 57 (the middleware might alternatively be downloaded from another computer) which provides a platform on which data processes can run and communicate with each other. In the present case, messaging between components (which might be run on different computers, or different virtual machines on the same computer) is provided by ActiveMQ software (ActiveMQ itself uses the Java Message Service provided as part of the Java Enterprise Edition software distribution), but other interprocess communication software or object request brokers could be used instead. Indeed, whilst providing message queues as a persistent communication mechanism between processing nodes is preferred, message passing or other transient communication mechanisms could be used as an alternative. Message queuing is preferred since it facilitates the sharing of data feeds. It provides a publish/subscribe system usable by the components to communicate with one another.

Data processing components are loaded into pipeline component hosting computers 40, 42, 44 from CD-ROM 58 (once again these could instead be downloaded by a data centre administrator, or uploaded by component developer working at a remote computer).

Pipeline creation and management software is installed on pipeline management computer 46 from CD-ROM 59 (once again it might instead be downloaded from another computer). As will be explained in more detail below, the pipeline creation and management software:

i) enables a developer to define a pipeline—i.e. a combination of one or more ingress processes (which receive and label items in respective data feeds), whose output is passed to one or a chain of two or more data feed processing components, whose output is in turn passed to an egress process;

ii) maintains a catalog of feeds, feed processing components, pipelines and pipeline segments, and presents these to developers as part of a graphical user interface enabling developers to define further pipelines;

iii) enables the deployment and running of instances of defined pipelines on/from said pipeline processing computers 40,42,44, and their subsequent stopping or removal.

The catalog or configuration file (in this embodiment, a JavaScript Object Notation (JSON) file) specifies a name for each component, limits on the number of feeds which the component can receive and the number of feeds the component can output, a textual description of what the component does, and, where required, a placeholder for configuration data required to configure the component. The configuration data could be a local file addressed using a path statement, or a remote file retrievable using the HyperText Transfer Protocol (HTTP). The file could be formatted as ASCII text, eXtensible Markup Language, or some proprietary format. In general the only requirement is that the component can retrieve and understand the configuration data.

The first application server computer 60 is provided with operating system, web-server, application-server and database management system software from CD-ROM 62. Data for use by the first application is stored in a database in persistent storage 61. Also installed on first application server computer 60 (from CD-ROM 63) is a first application program which offers a web-based application to web-users such as the user of personal computer 20. It will be understood that the application program is more likely in practice to have been uploaded from application developer's personal computer 18.

The second application server computer 70 is provided with operating system, web-server, and application-server software from CD-ROM 72. Data for use by the second application is stored in persistent storage 71 (e.g. a RAID array or hard disk). Also installed on second application server computer 70 (from CD-ROM 73) is a second application program which offers a web-based application to web-users such as the user of personal computer 20. Once again, it will be understood that the application program is more likely in practice to have been uploaded from application developer's personal computer 18.

Figure 2:
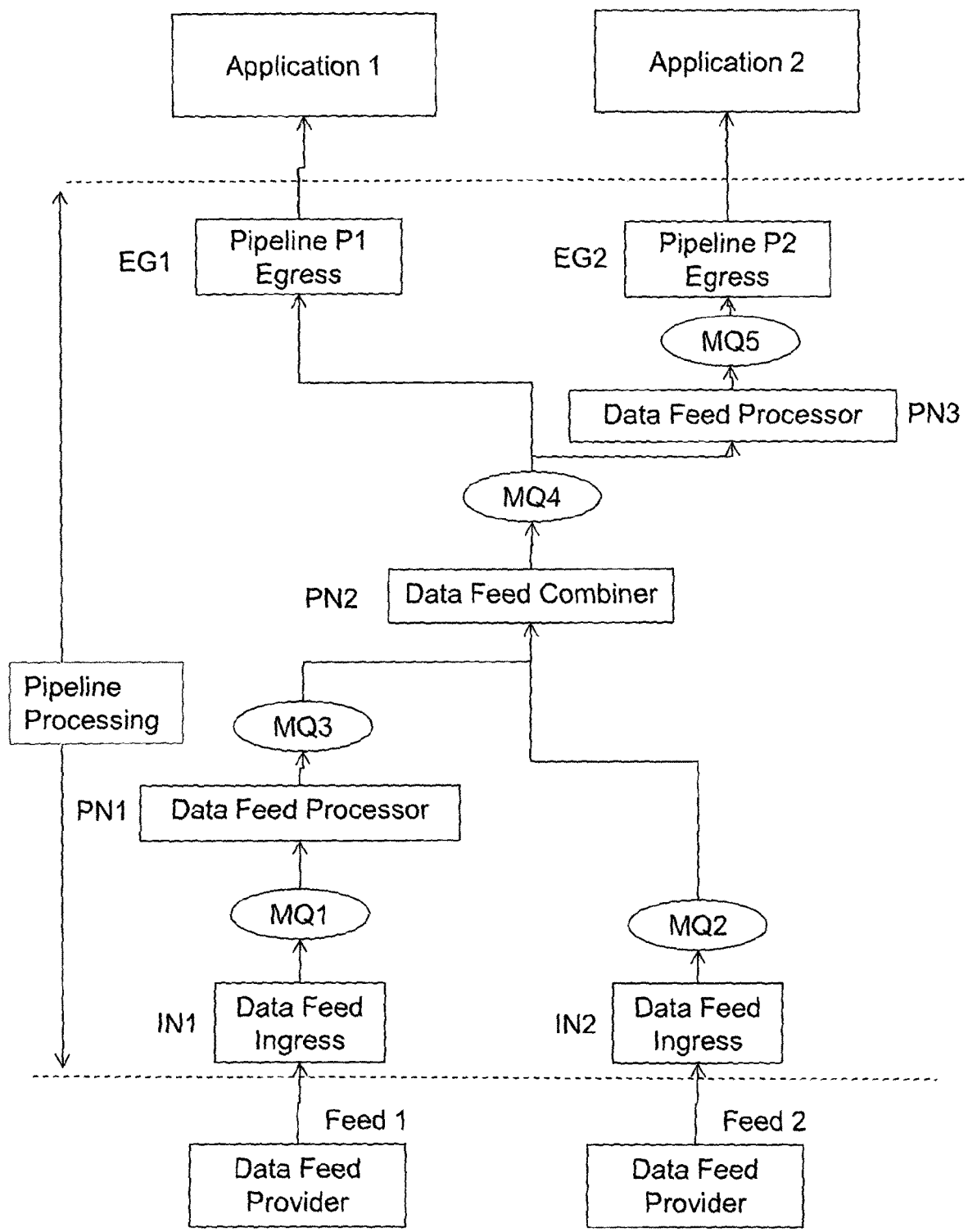
FIG. 2 illustrates a software architecture supported on the computer network of FIG. 1.

A general view of the software architecture supported by the computer network of FIG. 1 is shown in FIG. 2.

One or more streams of data items (e.g. Feed 1 and Feed 2) are provided by data feed providers to a pipeline processing platform. For each data feed provided, an ingress feed processing node (IN1, IN2) receives the data feed, adds some management information to one or more items in the data feed, checks the data item for validity against a schema for the feed, and passes the data items in the thereby processed data feed to a data item queue (MQ1, MQ2). Intermediate processes can be configured to read data items from a pipeline-developer-specified data item queue, process them, and then pass the processed data items to another data item queue (e.g. data feed processor PN1 takes items from input data item queue, MQ1, processes them, and then puts the processed data items in output data item queue MQ3). Processing components can combine or amalgamate data items from two or more queues (e.g. Data Feed Combiner PN2 combines items from data item queues MQ2 and MQ3 and places them in single queue MQ4). Two or more data feed processing components can take items from (or, to put it another way, can subscribe to) the same queue (e.g. both Data Feed Processor component PN3 and Egress component EG1 get a copy of each data item placed in data item queue MQ4). By joining data feed processing components via data item queues in this way, developers are able to construct pipelines which take one or more input data feeds, and process them to provide data of use to the developer of software (e.g. an application). Each application has a dedicated egress processing component (EG1, EG2), from which the application (or data store used by the application) gets the data on which it is based.

It is to be understood that each process will in most embodiments run on a different machine (or different virtual machine) within the data centre 14. The different components will cooperate by passing messages from one process to the next process in the pipeline. Each component process (save for the egress process) will process an incoming message and pass the processed message to the next process in the pipeline.

Ingress and intermediate nodes (IN1, IN2, PN1, PN2, PN3) may be shared between pipelines for different applications (or more generally, different processed feed receivers). In this case, a separate process could be run on the pipeline processing computing platform 40,42, 44 for each pipeline using the node, or a separate lightweight process, or (and this is preferred) a separate thread of control within a process could be provided for each application having a pipeline which includes the node.

As mentioned above, the pipeline management computer provides a pipeline specification interface to pipeline developers. In particular, it generates a dynamic web-page based on the configuration file (representing the catalog mentioned above) and makes the dynamic web-page available via the web server program to application developers.

Figure 3:
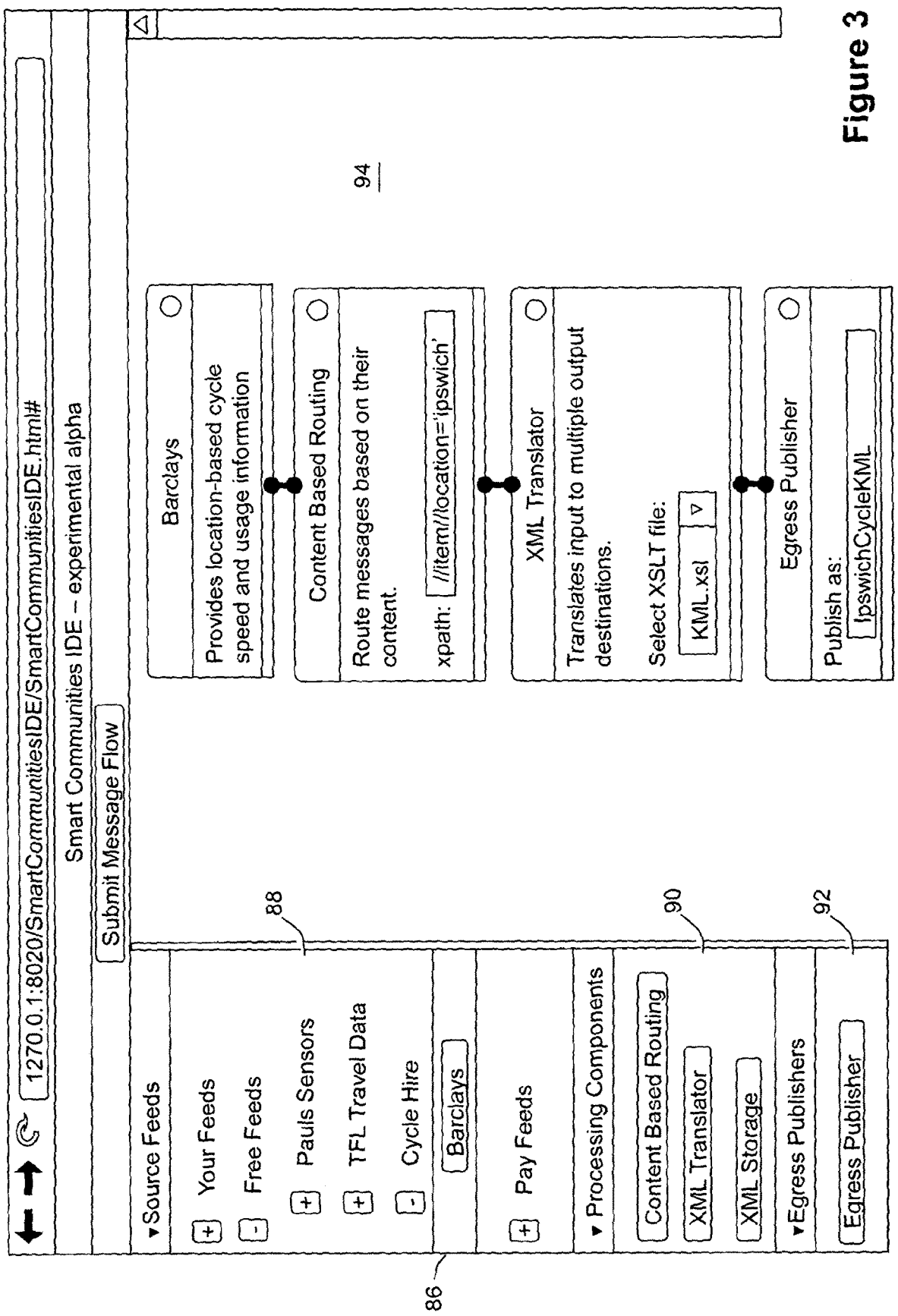
FIG. 3 illustrates a graphical user interface offered to application developers by a processing pipeline configuration tool.

An example of the Graphical User Interface provided in this way to a developer is shown in FIG. 3. The user interface will be seen to include a left-hand panel 86 which presents the developer with a menu of available feeds and processing components. The left-hand panel has a top section 88 which shows available feeds, a middle section 90 which shows available feed processing components, and a bottom section 92 which shows one or more available pipeline egress components. The main panel 94 provides an area on which a developer can specify a data processing pipeline. To do this, the developer selects: one or more source feed icons from top section 88; one or more processing component icons from the middle section 90; and one or more egress publisher component icons from the bottom section 92. As the developer selects the icons, corresponding GUI symbols appear in the main panel 94. Thereafter, the developer is able to connect the symbols together by clicking in turn on the two icons to be connected. Where the configuration file indicates that the components are configurable, the GUI symbols, provide an interface which enables the developer to configure the component in question.

Once the developer is satisfied with the pipeline he has created, he or she clicks on the 'submit message flow' button 98. In reaction to this, any component which the developer has indicated should be connected to a source feed is configured to subscribe to the message queue into which the data items from the source feed are placed. Where the developer has further indicated that a subsequent component is in turn connected to the previous component, the subsequent component is automatically configured to subscribe to the message queue fed by the previous component. This automatic configuration of each component in accordance with the developer's input is repeated until all egress nodes have been configured to subscribe to a processed feed.

The pipeline administration tool then compares executing pipelines in the catalog with the submitted pipeline description from source towards output to identify the existing executing pipeline which represents the longest exact match (both in component identity and component configuration) to the developer-specified pipeline. The pipeline administration computer then deploys suitably configured processes or threads to provide the necessary pipeline beyond the message queue fed by the already executing pipeline.

Once executing, the pipeline administration computer adds a specification of the pipeline (an alternating chain of nodes (with any node configuration information) and message queues) to the catalog file stored in persistent storage 54.

Mechanisms are provided for tearing down pipelines beyond any shared message queue when those pipelines are no longer required.

The GUI (FIG. 3) also provides a developer with an interface enabling the developer to upload components they have developed to component hosting computers 40-44. Those components are then added to the catalog and displayed on the GUI.

In the present embodiment, ingress and intermediate processes within the feed processing pipeline cumulatively add annotations to each message they process. The annotations thus provide a record of which processing nodes have processed the message. The administrator of the data centre 14 is thus able to manage the service provided to developers or other customers of the pipeline processing hosting service. By the time the feed for submission to the pipeline egress process EG1 has been derived, the cumulatively added annotations provide a complete record of the sequence of processing nodes which have processed the input feed within the processing pipeline. By creating a separate pipeline egress process for each developer or customer, it can be checked that the processing which has taken place in the pipeline is in conformance with customer-specific requirements. It is to be noted that the cumulative adding of annotations to messages passing through the processing pipeline allows the use of ingress and intermediate processes in the pipeline to be shared between different pipelines (and different developers) whilst still allowing separate administration and management of the different pipelines.

Figure 4:
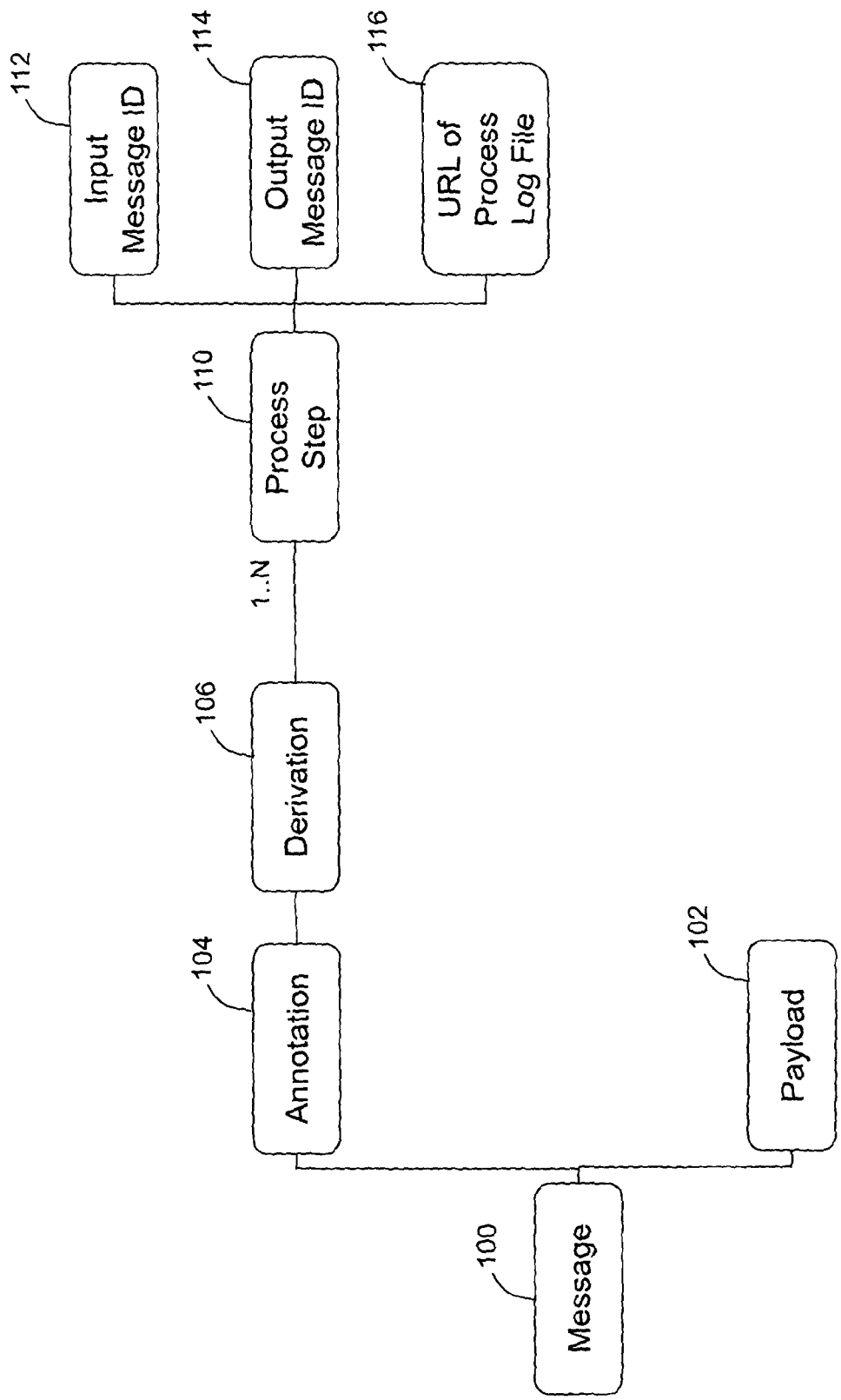
FIG. 4 illustrates a message format used for inter-component messaging in the pipeline processing system seen in FIG. 1.

A schema for messages created by processing nodes in the pipeline is shown in FIG. 4. Each message element 100 comprises a payload element 102 (application data which carries information for use by the target of the output feed from the pipeline and is derived from the sensor data from sensors 10, or more generally from one or more input data feeds) and an annotation element 104 which carries information useful to the administration of the pipeline processing. Given that the nature of the application data or payload is not important in embodiments of the present invention, it will not be described further here. The annotation element 104 comprises a derivation element 106 which in turn comprises one or more process step elements 110. Each processing node in the processing pipeline adds a process step element 110 to the message annotation 104 (as well as possibly altering the message payload).

Each process step element 110 includes an input message ID 112, an output message ID 114, and a log Universal Resource Locator 116 which points to the location of a log file maintained by the process (it will be understood that the URL will include an identifier of the node which carried out the process step 110 in question). Each process in the pipeline writes information to a log file in relation to each message which it processes. It will be understood that in the normal circumstance where each process runs on a different computer within the data centre 14, each process will store its log file in a different area of storage.

The information written to a log file by each node (pipeline component) is illustrated in FIG. 5. Each instance of message processing results in an entry being made into the log file associated with the process. Each entry comprises:

i) the same message instance ID 120 given to the message output by the process;

ii) the same message annotation 122 as found in the message output by the process;

iii) a Universal Resource Locator 124 which provides a reference to configuration data (stored by this node)—the configuration data might, for example, be an XSLT file, or for a simple web service, it might be just the address called to execute the web service e.g. for geocoding http://where-.yahooapis.com/geocode?. In the situation where services are instantiated dynamically the configuration data might comprise the address of the machine used for the execution and a reference to a build automation file (e.g. an Apache Maven Project Object Model (.pom) file) that allows the application to be built and executed. The deployed application may even then call upon further configuration files that could simply be an xml file. These would all be stored under the usual URL type syntax. This allows each service provider to maintain their own store of deployable objects and configuration files of the form http://suppliername.com/service1/deploy.pom And http://suppliername.com/service1/confiq.xml This also allows message flows to be built from a collection of suppliers with deployment and configuration being pulled in from a range of independent repositories.

iv) a Universal Resource Locator 126 which provides a reference to a file (stored by this node) in which the payload of the output message is stored;

v) a first performance parameter 128—in this embodiment, the time at which the process received the input message is recorded in the log file;

vi) a second performance parameter 130—the time at which the process output the message derived by the process;

vii) the transport type 132;

viii) the transport-endpoint 134; and ix) a time to live 136—which gives the time for which the log file entry is to be stored after being created.

It will be realised that by storing some information which is of potential use to downstream nodes which wish to obtain management information relating to nodes upstream from them in the flow, and sending one or more references to that stored information (which stored information might itself include references to further stored information), the amount of management information sent downstream is less than the amount of management information which is available to that downstream node. The additional level of indirection offered by providing a reference to a log file entry which itself includes a reference to a file offers a further improvement in which a downstream node can elect to acquire more detailed management information from the node (the log entry in this case), and then further elect to acquire even more detailed management information (e.g. the message as output by the node, or the relevant node configuration file) if the log entry indicates such further information would be of use.

Figure 6:
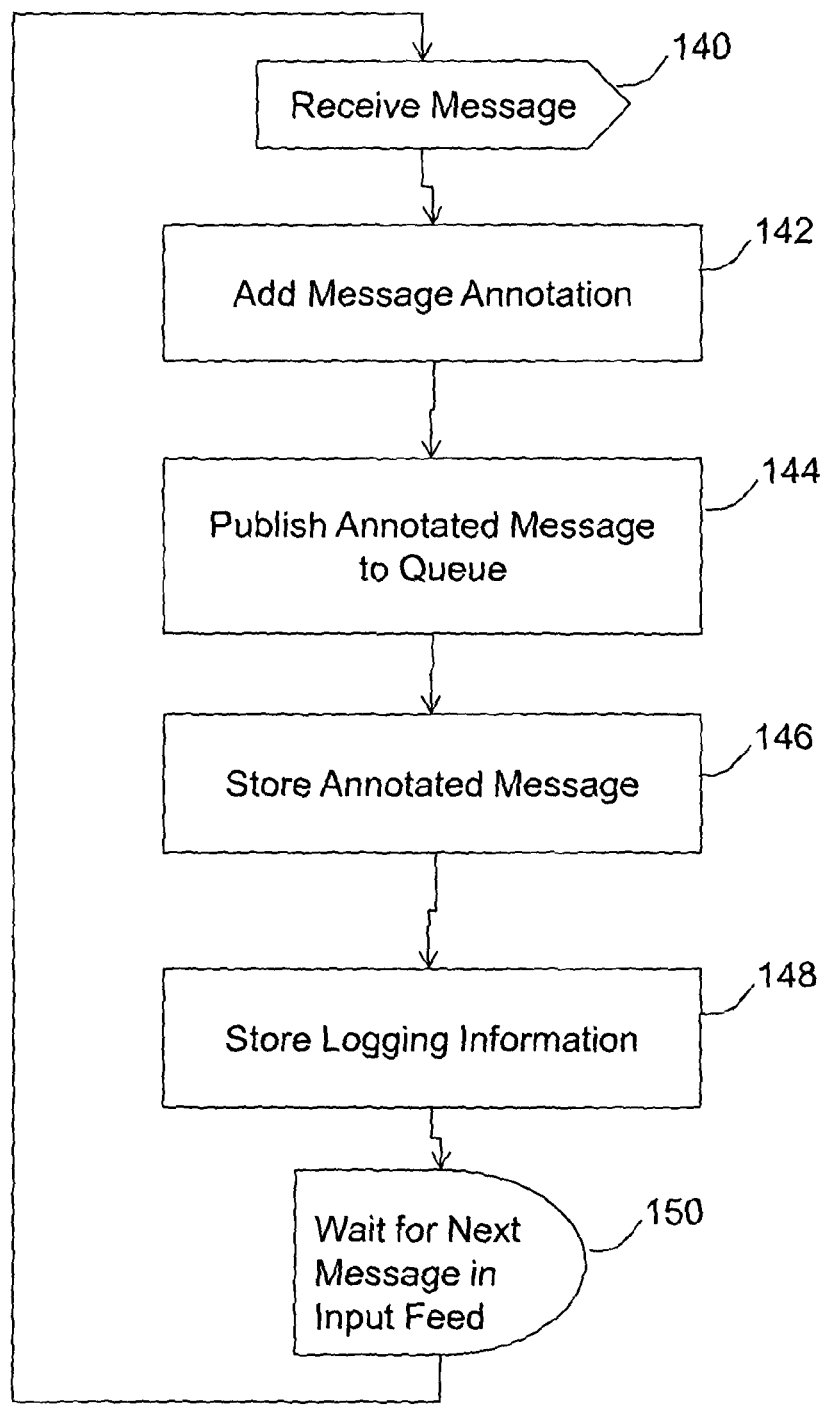
FIG. 6 is a flow-chart illustrating the processing carried out by an ingress component, in a pipeline.

FIG. 6 illustrates the processing carried out by pipeline ingress processes (IN1, IN2). The process begins when application data is received 140 from an input feed. An ingress node does not alter the application data, instead it just adds 142 a message annotation (in accordance with the schema seen in FIG. 4) to the input message. The message instance ID is just a unique combination of node ID and sequence number which the ingress process increments for each message which it processes.

The process then makes annotated message available 144 to the next process in the pipeline and stores 146 the annotated message at a predefined location. After that, the process stores 148 the logging information in storage associated with the machine on which the process is running. The log information stored is a log entry as described in relation to FIG. 4. The first two elements in the log entry (the instance ID of the annotated message 120 and the message annotation of the annotated message 122) can be straightforwardly copied from the annotated message produced by the ingress process. The URL 126 for the payload of the annotated message points to the above-mentioned predefined location at which the annotated message is stored. The timestamps 128, 130 are included in the log entry, as are the transport type and transport-endpoint 132, 134. The time-to-live 136 is set to a default value.

Because the same message instance ID is sent with the message, and used in the log entry, downstream are able to request the log entry appropriate to the message they receive.

Once the log file entry is created, the ingress process waits 150 for another message from the input feed to which it is dedicated.

Figure 7:
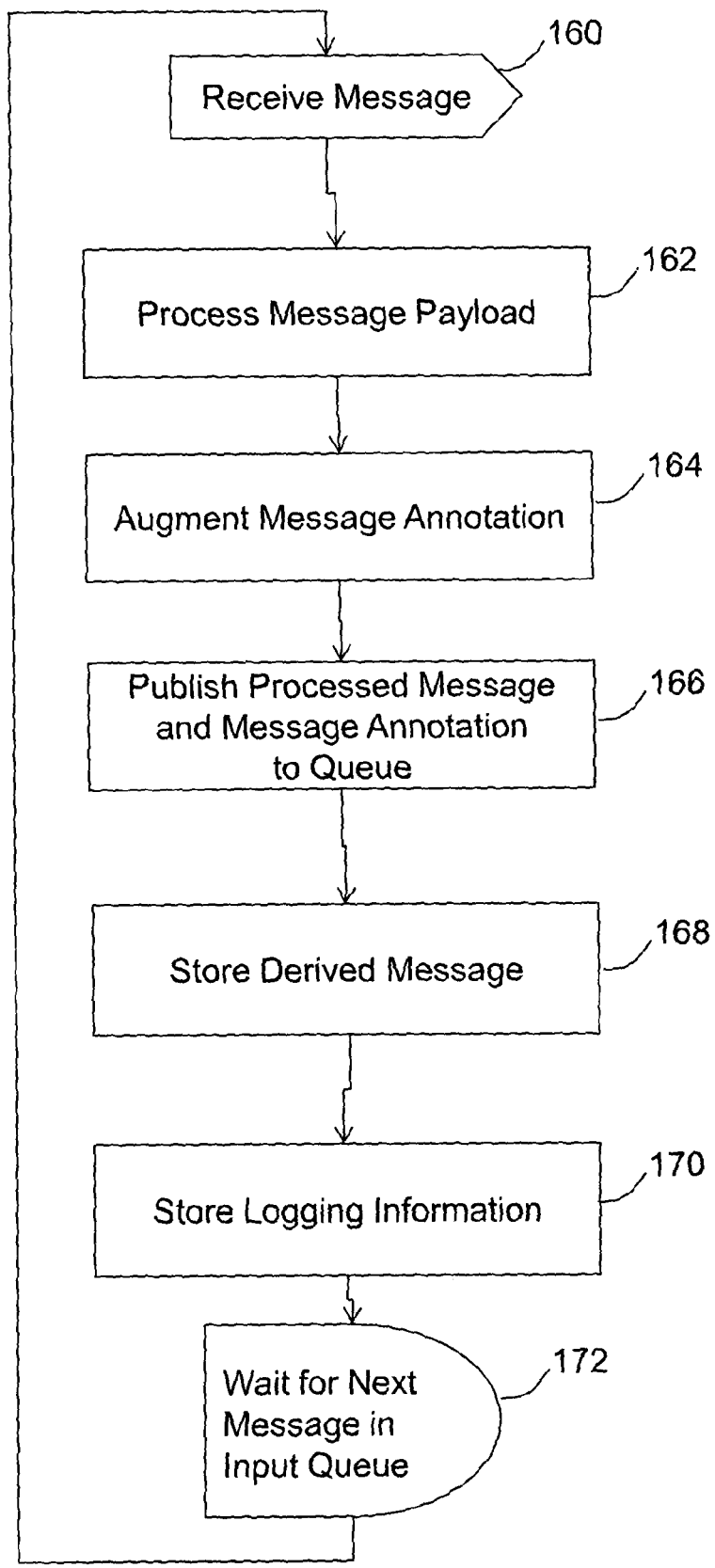
FIG. 7 is a flow-chart illustrating the processing carried out by an intermediate component in a pipeline.

FIG. 7 illustrates the processing carried out by intermediate processes (PN1, PN2, PN3) in the present embodiment. The process begins when a message is received 160 from one or more queues (MQ1, MQ3, MQ4, MQ5) to which this process (e.g. a thread) has been configured to subscribe. An intermediate node typically does some processing 162 on the payload of the input message to produce a message with an altered payload, and then adds 164 a process step element (FIG. 4: 110) to the derivation element 108 of the annotation accompanying the input message.

As with the ingress node, the message instance ID added by the intermediate node is just a unique combination of node ID and sequence number which the ingress process increments for each message which it processes. As before, this unique number enables downstream nodes to access a log entry appropriate to messages derived from this message. It will be seen that the message ID of the input message is different to the message ID of the output message.

The process then makes the processed and annotated message available 166 to subsequent processes and stores 168 the processed and annotated message at a message storage location. The intermediate process then stores 170 the logging information in storage associated with the machine on which the intermediate process is running. Once again, the log information stored is a log entry as described in relation to FIG. 4. The first two elements in the log entry (the instance ID of the annotated message 120 and the message derivation of the annotated message 122) can be straightforwardly copied from the augmented message annotation produced by the intermediate process. The URL 126 for the payload of the annotated message points to the above-mentioned message storage location at which the processed and annotated message is stored. The timestamps 128, 130 are included in the log entry, as are the transport type and transport-endpoint 132, 134. Once again, the time-to-live 136 is set to a default value.

Once the log file entry is created, the intermediate process (e.g. a thread) waits 172 for another message to arrive in the message queue to which it is configured to subscribe.

Figure 8:
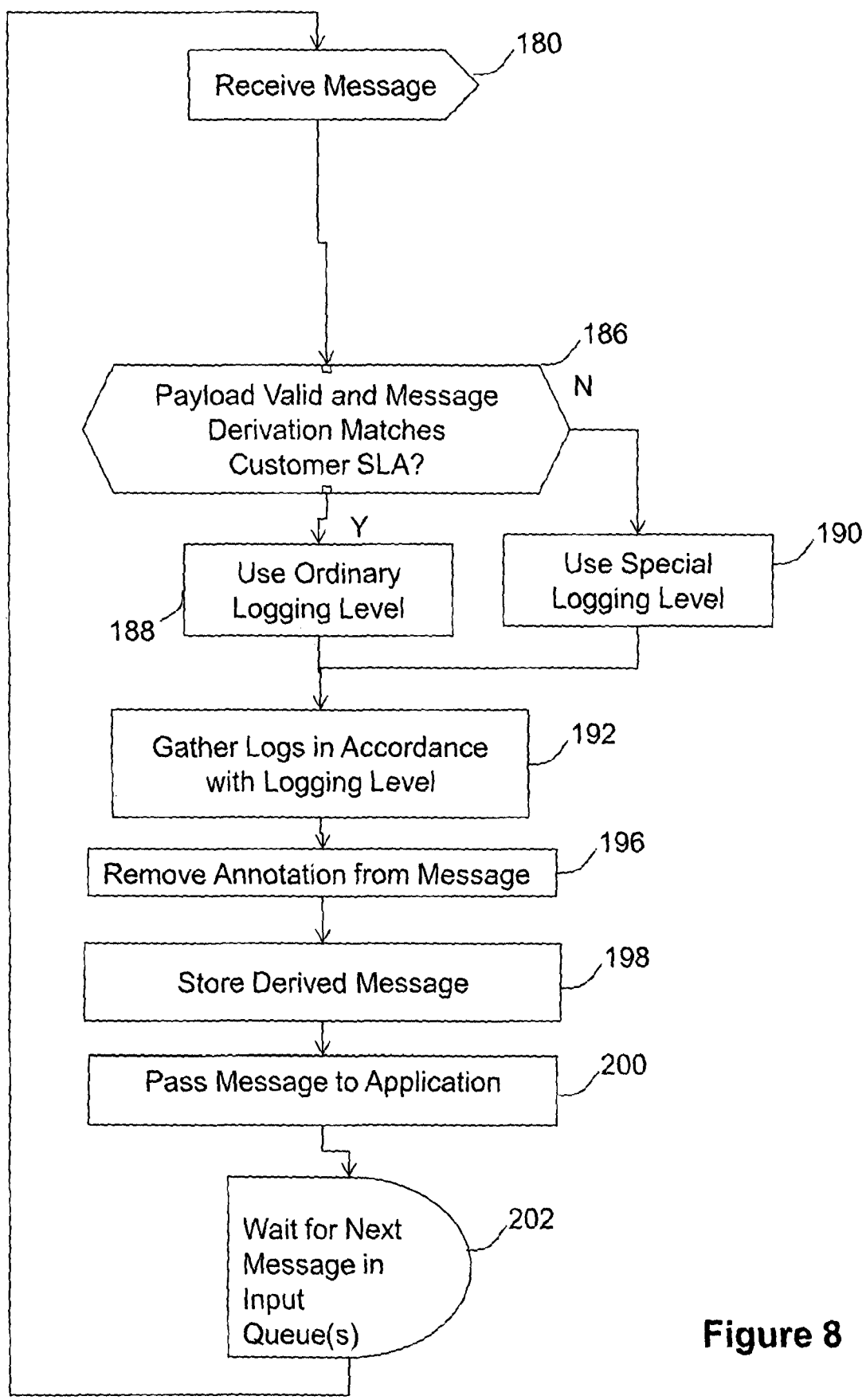
FIG. 8 is a flow-chart illustrating the processing carried out by an egress component in a pipeline.

FIG. 8 shows the processing performed by an egress node (EG1, EG2).

On receiving 180 a message at the egress process, the egress node checks 186 that the message annotations (in particular the process step elements) match the expected derivation of the message via the pipeline.

In general, a comparison can be with an Service Level Agreement (SLA) agreed with the customer—this can include customer requirements relating to performance (latency, process availability etc).

In order to establish whether such requirements have been met, the log files stored by the ingress and intermediate nodes can be accessed.

If it is found that the message annotation indicates that there is some discrepancy in the pipeline processing which has occurred, a logging level is raised 190. Otherwise, a default logging level is used 188.

The URLs of the log files of all the processes in the pipeline are read from some or all of the interface elements in the process step elements of the message annotation. The log files 192 are then gathered from those processing nodes in accordance with the logging level set.

This allows a comparison with, say, latency requirements included in the customer requirements. In general, it will be seen how the administrator of the pipeline processing system is able to monitor the performance of the system against customer requirements whilst using a relatively lightweight pipeline management system.

The contents of the node log history are exposed through the logging interface provided by each process. In the present embodiment, this is implemented as web services with the following methods:

GetNodeLog(message_ID)→returns logging txt and message XML
GetAllLogging( )→Returns text for all logging in buffer where log files are stored
GetBufferSize( )→for performance
DeleteNodeLog(Message_id)→Delete log entry from buffer
ClearAllLogging( )→Clear all log entries.

The process the Egress node follows to collect the stream logs will be dictated by a debug level. The level setting will dictate the granularity of the logging for that customer for each validation outcome. An example of the different logging contents could be:
1. Everything: The input, output XML of each node with full buffer records
2. Only the input xml to the Ingress and XML at the Egress and the final stream annotation.
3. Just the final stream annotation.
4. Boolean validation result.
5. No logging.

The debug level will be dependent on the outcome of the validation step (errors found) and the Service Level Agreement (SLA) for the customer consuming the message. It will also be possible to override these using a system wide debug level for system wide error analysis. So for example:
Gold SLA: logging option 1
Silver SLA: logging option 2
Bronze SLA: logging option 5

Having carried out the administration steps, the egress process removes 196 the annotation from the incoming message, stores 198 the derived message, and also passes 200 the derived message to the vehicle route planning application.

Thereafter, the egress process awaits 202 the next input message.

Many variations on the above described embodiments are possible, by way of example, these include:
i) whilst in the above embodiment, input feed data is shown as being obtained from sensors, in general, embodiments can handle input from any data source—including, but not limited to, any sort of sensor, document, database etc.
ii) whilst the above embodiment showed the service composition being composed of services running in a data centre, in many practical embodiments the service composition will be composed of services running on computers which are geographically distant from one another.
iii) In the above embodiment, a life expectancy was set on each message, after which it would be removed from the node log. This could only be used if the expected processing time from Ingress to Egress was predictable. It provides a lighter weight implementation by removing the need for a deletion message. In alternative embodiments, messages are deleted automatically.
iv) In the above embodiment, the sensor network published a Really Simple Syndication (RSS) feed. Data interchange formats other than RSS might, of course, be used—one of many other possibilities is to use the Atom Syndication Format as set out in the Internet Engineering Task Force's Request for Comments (RFC) 4287.
v) It is to be noted that the logging interface URL now additionally includes a configuration reference c_XSLT( ). This reference is a pointer to a configuration reference held by the pipeline processing system administrator. The configuration reference is a flexible entity which describes, or points to a description of, processing carried out by the node. The configuration reference might, for example, point to an Extensible Stylesheet Language Transformations (XSLT) file (as in this example), or to an Event Programming Language script described some complex event processing carried out by the node, or to a rule matched for the message, or to a URL of a web service used by the processed component together with an indication of the parameters passed to the web service.
vi) In the above embodiment, each node through which the message passed annotated the message with a reference to an interface which allowed the extraction of log information by a subsequent node. The message arriving at an egress node thus had a list of log interfaces. However, in an alternative embodiment, each node might store in its log, the log interface information arriving in the message from the preceding node, and replace the log interface information in the message with a reference to its own log interface. Then, a node can gather logs relevant to the creation of an incoming message, by first retrieving the log from the immediately preceding node, finding within that log information the reference to the log in the node which preceded the immediately preceding node, and extract the log from there, and so on, back to the source of the message. This would increase the efficiency of use of bandwidth since the message annotation would be shorter. An variant on that alternative would involve each node being programmed with a recursive gather-logs-from-preceding-nodes function which would require each node to request the logs from all preceding nodes, each node passing that request to the preceding node, until the ingress node provides its log to the first intermediate node, which in turn passes its log and the ingress node log to the succeeding intermediate node, and so on, until the last intermediate node passes the entire message log to the egress node.

In summary of the above disclosure, a system for managing compositions of software components or applications is disclosed. In particular, systems in which the software components or applications communicate with one another using message-oriented middleware are considered. The system is fed by one or more data feeds, and produces a plurality of processed feeds for respective applications. The data items in the input data feeds are processed by the software components or applications which form a data feed processing graph, with each application having a processing path (or egress-rooted tree) which results in the processed feed for that application. Managing such systems is complex. This complexity is tackled by having each component processing a data feed item add an annotation to the data feed item, so that the cumulative annotation which is seen in the processed feed for an application provides a history of the processing carried out on the input data feed(s). At an egress of the processing system, this history can be compared (186) with an application-specific specification. Arranging the management of a data feed processing system in this way simplifies the management of such systems, and hence improves the efficiency of resource utilisation of such systems.

What is claimed is:

1. A method of managing a message-oriented distributed data stream processing system providing, for each of a plurality of applications, a data processing pipeline comprising an ingress node, one or more intermediate nodes and an egress node, the egress node being dedicated to a particular application, the method comprising operating the egress node to:
   a) receive an application data stream item in a stream of application data stream items for the particular application, the application data stream item comprising:
      i) derived application data derived by the data processing pipeline for the particular application; and
      ii) a plurality of references to nodal data stream processing information stored by nodes in the data processing pipeline, each reference including an identifier of a data stream processing node which generated the reference, and the nodes in the data processing pipeline including (i) at least one of the intermediate nodes and (ii) at least another one of the intermediate nodes or the ingress node, and the nodal data stream processing information stored by the nodes in the data processing pipeline including a history of processing performed by the nodes and a reference to a file containing the derived application data; and
   b) collecting management data relating to the operation of the data processing pipeline in deriving the derived application data by using the plurality of references to the nodal data stream processing information in the received application data stream item to collect the nodal data stream processing information relating to the derivation of the derived application data from the nodes in the data processing pipeline;
   wherein the method further comprises sending a request for the nodal data stream processing information based on the plurality of references, and wherein the nodal data stream processing information stored by the nodes in the data processing pipeline is provided to the egress node in response to the request sent from the egress node.

2. The method according to claim 1 wherein said application data stream item is received via a data stream processing node which provides data stream items for at least one other node in said message-oriented distributed data stream processing system.

3. The method according to claim 1 wherein the nodal data stream processing information includes nodal configuration data relating to a configuration of one of a plurality of data stream processing nodes.

4. The method according to claim 1 further comprising:
   comparing application data stream processing history information with an application-specific data stream processing specification specific to said particular application; and
   based on the comparing of the application data stream processing history information with the application-specific data stream processing specification specific to said particular application, managing operation of each of a plurality of data stream processing nodes which have contributed to the derivation of said derived application data.

5. The method according to claim 1 further comprising:
   comparing application data stream processing history information with an application-specific data stream processing specification specific to said particular application; and
   based on a finding in the comparison of the application data stream processing history information with the application-specific data stream processing specification that the application data stream processing history information does not meet the application-specific data stream processing specification, activating an enhanced history collector to collect the nodal data stream processing information from one of a plurality of data stream processing nodes.

6. The method according to claim 1 wherein application data stream processing history information comprises a plurality of process step elements added to the application data stream processing history information by respective data stream processing nodes involved in the derivation of the derived application data.

7. The method according to claim 1 further comprising operating the egress node to store an application specific data stream processing specification.

8. The method according to claim 1 in which application data stream processing history information comprises at least one process step element added to the application data stream processing history information by the data stream processing node which generated the derived application data, the process step element thereby exposing the cumulative processing carried out by a plurality of data stream processing nodes in deriving the derived application data, and the method further comprises operating the egress node to compare the application data stream processing history information with an application-specific data stream processing specification.

9. The method according to claim 1 further comprising operating the egress node to find whether application data stream processing history information conforms to an application-specific data stream processing specification, and wherein the collection of the nodal data stream processing information from the nodes in the data processing pipeline is performed in response to finding that the application data stream processing history information does not conform to the application-specific data stream processing specification.

10. The method according to claim 1 further comprising operating the egress node to pass the application data stream item to the particular application.

11. A method of managing a message-oriented distributed data stream processing system providing, for each of a plurality of applications, a data processing pipeline comprising an ingress node, one or more intermediate nodes and an egress node, the egress node being dedicated to a particular application, the method comprising operating the egress node to:
   a) receive an application data stream item in a stream of application data stream items for the particular application, the application data stream item comprising:
      i) derived application data derived by the data processing pipeline for the particular application; and ii) a plurality of references to nodal data stream processing information stored by nodes in the data processing pipeline, each reference including an identifier of a data stream processing node which generated the reference, and the nodes in the data processing pipeline including (i) at least one of the intermediate nodes and (ii) at least another one of the intermediate nodes or the ingress node; and b) collecting management data relating to the operation of the data processing pipeline in deriving the derived application data by using the plurality of references to the nodal data stream processing information in the received application data stream item to collect the nodal data stream processing information relating to the derivation of the derived application data from the nodes in the data processing pipeline;

wherein each of said references comprises a unique data stream item identifier which uniquely identifies a data stream item in the message-oriented distributed data stream processing system, and the collection of the nodal data stream processing information relating to the derivation of the derived application data involves sending a request to each of the nodes in the data processing pipeline, each request to a node in the data processing pipeline including the unique data stream identifier inserted into the application data stream item by the node receiving the request and present in the application data stream item received at the egress node.

12. A management node comprising:
a processing system, including a computer hardware processor, an input communications port, an output communications port, and a storage medium storing instructions executable by the computer hardware processor such that the processing system is at least configured to perform the method of claim 1 such that the management node is configured to operate as the egress node.

13. The management node according to claim 12 wherein the message-oriented distributed data stream processing system is further configured to receive the application data stream via one of a plurality of data stream processing nodes which provides the same data stream to at least one other of the plurality of data stream processing nodes in the message-oriented distributed data stream processing system.

14. The management node according to claim 12 wherein application data stream processing history information comprises a plurality of process step elements added to the application data stream processing history information by respective data stream processing nodes involved in the derivation of the derived application data.

15. A non-transitory computer readable medium tangibly embodying a program of instructions executable to carry out the method of claim 1.

16. A method of managing a message-oriented distributed data stream processing system fed by data streams from respective sensors, said method comprising operating an egress node of said message-oriented distributed data stream processing system, the egress node being dedicated to a particular application, to:

a) receive an application data stream comprising a stream of application data stream items, each application data stream item comprising:
i) derived application data derived by one or more data stream processing nodes in said message-oriented distributed data stream processing system from the data streams input from the respective sensors into said message-oriented distributed data stream processing system; and
ii) application data stream processing history information relating to the cumulative processing carried out by said one or more data stream processing nodes in deriving said application data stream item;

b) compare said application data stream processing history information relating to the cumulative processing previously carried out by said one or more data stream processing nodes in deriving said application data stream item with an application data stream processing specification specific to said particular application;

c) determine that the application data stream processing history information does not conform to the application data stream processing specification, d) in response to the determination that the application data stream processing history information does not conform to the application data stream processing specification, determine a debug level that dictates the granularity of the logging for a customer associated with the application data stream processing specification and gathering logs in accordance with the debug level relating to the operation of the data stream processing system in deriving the application data stream item; and e) pass the application data stream item to the application.

17. A management node for managing a message-oriented distributed data stream processing providing, for each of a plurality of applications, a data processing pipeline comprising an ingress node, one or more intermediate nodes and an egress node, the management node being an egress node, dedicated to a particular application, the management node comprising:

a processing system, including a computer hardware processor, an input communications port, an output communications port, and a storage medium storing instructions executable by the computer hardware processor such that the processing system is at least configured to:

a) receive via the input communications port, an application data stream item in an application data stream comprising a stream of application data stream items for the particular application, the application data stream item comprising:
i) derived application data derived by the ingress node and the one or more intermediate nodes in the data processing pipeline for the particular application; and
ii) a plurality of references to nodal data stream processing information stored by nodes in the data processing pipeline, each reference including an identifier of a node which generated the reference, and the nodes in the data processing pipeline including (i) at least one of the intermediate nodes and (ii) at least another one of the intermediate nodes or the ingress node;

b) collect management data relating to the operation of the data processing pipeline in deriving the derived application data by using the plurality of references to the nodal data stream processing information in the received application data stream item to collect the nodal data stream processing information relating to the derivation of the derived application data from the nodes in the data processing pipeline;

wherein each of said references comprises a unique data stream item identifier which uniquely identifies a data stream item in the message-oriented distributed data stream processing system, and the collection of the nodal data stream processing information relating to the derivation of the derived application data involves sending a request to each of the nodes in the data processing pipeline, each request to a node in the data processing pipeline including the unique data stream identifier inserted into the application data stream item by the node receiving the request and present in the application data stream item received at the egress node.

18. A method of managing a message-oriented distributed data stream processing system providing, for each of a plurality of applications, a data processing pipeline comprising an ingress node, one or more intermediate nodes and an egress node, the egress node being dedicated to a particular application, the method comprising operating the egress node to:
 a) receive an application data stream item in a stream of application data stream items for the particular application, the application data stream item comprising:
  i) derived application data derived by the data processing pipeline for the particular application; and
  ii) a first reference to nodal data stream processing information stored by an immediately preceding node in the data processing pipeline, the first reference including an identifier of the immediately preceding node in the data processing pipeline; and
 b) collecting management data relating to the operation of the data processing pipeline in deriving the derived application data by sending a request for the nodal data stream processing information to the immediately preceding node in the data processing pipeline and sending another request for nodal data stream processing information stored by another node which precedes the immediately preceding node in the data processing pipeline, the collecting of the management data including:
  retrieving the nodal data stream processing information stored by the immediately preceding node, the nodal data stream processing information stored by the immediately preceding node including a second reference to the nodal data stream processing information stored by the another node,
  retrieving the nodal data stream processing information stored by the another node using the second reference included in the nodal data stream processing information retrieved from the immediately preceding node;
 wherein each of the first reference and the second reference comprises a unique data stream item identifier which uniquely identifies a data stream item in the data processing system, and each request to the immediately preceding node and the another node in the data processing pipeline includes the unique data stream identifier inserted into the application data stream item by the node receiving the request.

19. A method of managing a message-oriented distributed data stream processing system providing, for each of a plurality of applications, a data processing pipeline comprising an ingress node, one or more intermediate nodes and an egress node, the egress node being dedicated to a particular application, the method comprising:
 operating the egress node to:
  a) receive an application data stream item in a stream of application data stream items for the particular application, the application data stream item comprising:
   i) derived application data derived by the data processing pipeline for the particular application; and
   ii) a reference to nodal data stream processing information stored by a preceding node in the data processing pipeline and relating to the derivation of the derived application data, the reference including an identifier of the preceding node in the data processing pipeline; and
  b) using the reference in the received application data stream item, instruct the preceding node in the data processing pipeline to collect management data relating to the derivation of the derived application data;
 operating the preceding node and any further intermediate node(s) upstream of the preceding node in the data processing pipeline to receive a management data collection instruction from an immediately downstream node in the pipeline, use another reference included in the management data collection instruction to find stored nodal data stream processing information relating to the derivation of the derived application data, extract a reference to a node immediately upstream in the data processing pipeline from the nodal data stream processing information, and use the reference to the node immediately upstream to instruct the node immediately upstream of it in the data processing pipeline to provide nodal data stream processing information relating to the derivation of the derived application data;
 operating the ingress node to respond to a request to collect management data from an intermediate node immediately downstream of it in the data processing pipeline to use a reference included in the request to identify relevant nodal data stream processing information and provide the relevant nodal data stream processing information to the intermediate node immediately downstream from it in the data processing pipeline;
 further operating each intermediate node, on receiving nodal data stream processing information to add its own nodal data stream processing information relating to the derivation of the derived application data and pass a collection of nodal data stream processing information to a node immediately downstream of it in the data processing pipeline; and
 operating the egress node to receive the collection of nodal data stream processing information relating to the derivation of the derived application data.

20. The method according to claim 19 wherein each of said references comprises a unique data stream item identifier which uniquely identifies a data stream item in the message-oriented distributed data stream processing system, and each request to a node in the data processing pipeline includes the unique data stream identifier inserted by the node receiving the request.

21. A method of managing a message-oriented distributed data system providing, for each of a plurality of applications, a data processing pipeline comprising an ingress node, one or more intermediate nodes and an egress node, the egress node being dedicated to a particular application, the method comprising:
 operating an intermediate node in the data processing pipeline to:
  a) receive one or more input data stream items from the node preceding the intermediate node in the data processing pipeline, each input data stream item comprising:
   i) input stream data; and
   ii) a reference to nodal stream data processing information stored by the node preceding the intermediate node in the data processing pipeline, the reference including an identifier of the node preceding the intermediate node in the data processing pipeline, and the nodal stream data processing information stored by the node preceding the intermediate node including a history of processing performed by the node preceding the intermediate node and a reference to a file containing the input stream data;
b) derive derived stream data from the input stream data;
c) store intermediate nodal stream data processing information relating to a derivation of the derived stream data;
d) generate an output data stream item comprising:
i) the reference, received from the node preceding the intermediate node in the data processing pipeline, to the nodal stream data processing information stored by the node preceding the intermediate node in the data processing pipeline;
ii) the derived stream data; and
iii) a reference to the intermediate nodal stream data processing information, said reference to the intermediate nodal stream data processing information including an identifier of an intermediate data stream processing node, and the intermediate nodal stream data processing information stored by the intermediate data stream processing node including a history of processing performed by the intermediate data stream processing node and a reference to a second file containing the derived stream data;
operating the egress node of the data processing pipeline to:
A) receive the output data stream item from the intermediate node;
B) request the nodal stream data processing information from the node preceding the intermediate node in the data processing pipeline using the reference received by the intermediate node; and
C) request the intermediate nodal stream data processing information from the intermediate node using the reference sent by the intermediate node;
further operating the node preceding the intermediate node to respond to the request by providing the nodal stream data processing information;
further operating the intermediate node to respond to the request by providing the intermediate nodal stream data processing information; and
further operating the egress node to manage the message-oriented distributed data stream processing system by combining the nodal stream data processing information from the intermediate node and the nodal stream data processing information from the node preceding the intermediate node;
wherein the nodal stream data processing information and the intermediate nodal stream data processing information are provided to the egress node in response to the requests from the egress node.

22. A method of managing a message-oriented distributed data stream processing system providing, for each of a plurality of applications, a data processing pipeline comprising an ingress node, one or more intermediate nodes and an egress node, the egress node being dedicated to a particular application, the method comprising operating one of the intermediate nodes to:

a) receive one or more input data stream items from a previous node in the data processing pipeline, the previous node being the ingress node or another intermediate node in the data processing pipeline, each input data stream item comprising:
i) input stream data; and
ii) a reference to nodal stream data processing information stored by the previous node in the data processing pipeline, the reference including an identifier of a data stream processing node which generated the reference, and the nodal stream data processing information stored by the previous node including a history of processing performed by the previous node,
b) deriving derived stream data from the input stream data;
c) storing intermediate nodal stream data processing information relating to a derivation of the derived stream data;
d) generating an output data stream item comprising:
i) the reference, received from the previous node in the data processing pipeline, to the nodal stream data processing information stored by the previous node in the data processing pipeline;
ii) the derived stream data; and
iii) a reference to the intermediate nodal stream data processing information, said reference to the intermediate nodal stream data processing information including an identifier of the one of the intermediate nodes, and the intermediate nodal stream data processing information stored by the one of the intermediate data stream processing node including a history of processing performed by the one of the intermediate nodes;
e) receiving, directly or indirectly from the egress node, a request for said intermediate nodal stream data processing information based on the reference to the intermediate nodal stream data processing information sent by the one of the intermediate nodes in the output data stream item; and
f) providing said intermediate nodal stream data processing information in response to said request;
wherein each of said references comprises a unique data stream item identifier which uniquely identifies a data stream item in the message-oriented distributed data stream processing system, and
wherein the request received by the one of the intermediate nodes for said intermediate nodal stream data processing information includes a first unique data stream identifier inserted into the output data stream item by the one of the intermediate nodes and present in the output data stream item provided to the egress node, and the first unique data stream identifier is different from a second unique data stream identifier inserted into the input data stream item by the previous node and present in the output data stream item provided to the egress node to enable collection of the nodal data stream processing information relating to the derivation of the derived application data using respective requests including the first and second unique identifiers that are received by the one of the intermediate nodes and the previous node, respectively.

23. A method of managing a message-oriented distributed data stream processing system providing, for each of a plurality of applications, a data processing pipeline comprising an ingress node, one or more intermediate nodes and an egress node, the egress node being dedicated to a particular application, the method comprising operating one of the intermediate nodes to:
- a) provide an application data stream item in a stream of application data stream items for the particular application, the application data stream item comprising:
  - i) derived application data derived by the data processing pipeline for the particular application; and
  - ii) a first reference to nodal data stream processing information stored by the one of the intermediate nodes in the data processing pipeline, the first reference including an identifier of the one of the intermediate nodes in the data processing pipeline; and
- b) providing management data relating to the operation of the data processing pipeline in deriving the derived application data in response to a request for the nodal data stream processing information received by the one of the intermediate nodes in the data processing pipeline from the egress node, the providing of the management data including:
  - providing the nodal data stream processing information stored by the one of the intermediate nodes to the egress node, the nodal data stream processing information stored by the one of the intermediate nodes including a second reference to the nodal data stream processing information stored by the ingress or another intermediate node to enable the nodal data stream processing information stored by the ingress or another intermediate node to be provided to the egress node using the second reference; and
  - wherein the nodal data stream processing information stored by the one of the intermediate nodes is provided in accordance with a debug level which dictates a granularity of logging for a customer associated with an application data stream processing specification and which relates to an operation of the message-oriented distributed data stream processing system in deriving the application data stream item.

24. A management node comprising: a processing system, including a computer hardware processor, an input communications port, an output communications port, and a storage medium storing instructions executable by the computer hardware processor such that the processing system is at least configured to perform the method of claim 16 such that the management node is configured to operate as the egress node.

25. A management node comprising: a processing system, including a computer hardware processor, an input communications port, an output communications port, and a storage medium storing instructions executable by the computer hardware processor such that the processing system is at least configured to perform the method of claim 22 such that the management node is configured to operate as the one of the intermediate nodes.

26. A management node comprising: a processing system, including a computer hardware processor, an input communications port, an output communications port, and a storage medium storing instructions executable by the computer hardware processor such that the processing system is at least configured to perform the method of claim 23 such that the management node is configured to operate as the one of the intermediate nodes.

27. A non-transitory computer readable medium tangibly embodying a program of instructions executable to carry out the method of claim 11.

28. A non-transitory computer readable medium tangibly embodying a program of instructions executable to carry out the method of claim 16.

29. A non-transitory computer readable medium tangibly embodying a program of instructions executable to carry out the method of claim 22.

30. A non-transitory computer readable medium tangibly embodying a program of instructions executable to carry out the method of claim 23.

* * * * *